United States Patent
Konttori et al.

(10) Patent No.: US 9,711,114 B1
(45) Date of Patent: *Jul. 18, 2017

(54) DISPLAY APPARATUS AND METHOD OF DISPLAYING USING PROJECTORS

(71) Applicant: Varjo Technologies Oy, Helsinki (FI)

(72) Inventors: Urho Konttori, Helsinki (FI); Klaus Melakari, Oulu (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,497

(22) Filed: Dec. 1, 2016

(51) Int. Cl.
G09G 5/377 (2006.01)
G06F 3/01 (2006.01)
H04N 9/31 (2006.01)

(52) U.S. Cl.
CPC ............. G09G 5/377 (2013.01); G06F 3/013 (2013.01); H04N 9/317 (2013.01); H04N 9/3147 (2013.01); H04N 9/3185 (2013.01); G09G 2340/10 (2013.01); G09G 2354/00 (2013.01)

(58) Field of Classification Search
CPC ..... G06T 19/006; G06T 19/20; G06T 15/503; G06F 3/013
See application file for complete search history.

(56) References Cited

U.S. PATENT DOCUMENTS

| | | |
|---|---|---|
| 931,683 A | 8/1909 | Cox |
| 7,872,635 B2 | 1/2011 | Mitchell |
| 7,973,834 B2 | 7/2011 | Yang |
| 2016/0240013 A1* | 8/2016 | Spitzer ................... G06F 3/013 |
| 2016/0342840 A1* | 11/2016 | Mullins ............. G06K 9/00671 |

OTHER PUBLICATIONS

Anjul Patney et al. "Perceptually-Based Foveated Virtual Reality," Retrieved at https://research.nvidia.com/publication/perceptually-based-foveated-virtual-reality, Jul. 2016, 2 pages.

* cited by examiner

*Primary Examiner* — Michael Faragalla
(74) *Attorney, Agent, or Firm* — Zeigler IP Law Group, LLC

(57) ABSTRACT

A display apparatus and a method of displaying via the display apparatus. The display apparatus includes at least one context image projector or at least one context display for rendering a context image, wherein an angular width of a projection of the rendered context image ranges from 40 degrees to 220 degrees, and at least one focus image projector for rendering a focus image, wherein an angular width of a projection of the rendered focus image ranges from 5 degrees to 60 degrees. An arrangement is made to combine the projection of the rendered focus image with the projection of the rendered context image to create a visual scene.

18 Claims, 5 Drawing Sheets

DISPLAY APPARATUS AND METHOD OF DISPLAYING USING PROJECTORS

TECHNICAL FIELD

The present disclosure relates generally to representation of visual information; and more specifically, to display apparatuses comprising context image projectors or context displays, and focus image projectors. Furthermore, the present disclosure also relates to methods of displaying, via the aforementioned display apparatuses.

BACKGROUND

In recent times, there have been rapid advancements in technologies for simulating virtual environments for applications such as gaming, education, military training, healthcare surgery training, and so forth. Specifically, technologies such as virtual reality, augmented reality and so forth present the simulated environment (often known as 'virtual world') to a user of a device. The simulated environment is presented by rendering images constituting the simulated on displays in the device. Examples of such devices include head mounted virtual reality devices, virtual reality glasses, augmented reality headset, and so forth. Such devices are adapted to present to the user, a feeling of immersion in the simulated environment using contemporary techniques such as stereoscopy. Often, a field of view of such devices is typically about 100°, which is much lesser as compared to a field of view of humans which is typically about 180°.

Further, such existing devices have certain limitations. In an example, conventional displays used in such devices are of small size. Specifically, a pixel density offered by such displays is about 15 pixels per degree whereas fovea of the human eye has a pixel density of about 60 pixels per degree. Consequently, due to low pixel density, such displays are unable to imitate visual acuity of eyes of humans. Further, displays offering high pixel density are dimensionally too large to be accommodated in such devices. In another example, conventional displays such as focus plus context screens used in such devices include a high resolution display embedded into a low resolution display. However, position of the high resolution display within such focus plus context screens is often fixed at a particular position. Further images rendered on such focus plus context screens appear discontinuous at edges of the high and low resolution displays. Consequently, such existing devices are not sufficiently well developed and are limited in their ability to mimic the human visual system.

Therefore, in light of the foregoing discussion, there exists a need to overcome the aforementioned drawbacks associated with conventional displays used in devices for implementing simulated environments.

SUMMARY

The present disclosure seeks to provide a display apparatus. The present disclosure also seeks to provide a method of displaying, via a display apparatus comprising at least one context image projector or at least one context display, and at least one focus image projector. The present disclosure seeks to provide a solution to the existing problem of pixel density and physical size tradeoffs, and image discontinuities within conventional displays used in devices for implementing simulated environments. An aim of the present disclosure is to provide a solution that overcomes at least partially the problems encountered in prior art, and provides a display apparatus that closely mimics the human visual system.

In one aspect, an embodiment of the present disclosure provides a display apparatus comprising:
- at least one context image projector or at least one context display for rendering a context image, wherein an angular width of a projection of the rendered context image ranges from 40 degrees to 220 degrees; and
- at least one focus image projector for rendering a focus image, wherein an angular width of a projection of the rendered focus image ranges from 5 degrees to 60 degrees, wherein an arrangement is made to combine the projection of the rendered focus image with the projection of the rendered context image to create a visual scene.

In another aspect, an embodiment of the present disclosure provides a method of displaying, via a display apparatus comprising at least one context image projector or at least one context display, and at least one focus image projector, the method comprising:
(i) rendering a context image via the at least one context image projector or the at least one context display, wherein an angular width of a projection of the rendered context image ranges from 40 degrees to 220 degrees;
(ii) rendering a focus image via the at least one focus image projector, wherein an angular width of a projection of the rendered focus image ranges from 5 degrees to 60 degrees; and
(iii) arranging for the projection of the rendered focus image to be combined with the projection of the rendered context image to create a visual scene.

Embodiments of the present disclosure substantially eliminate or at least partially address the aforementioned problems in the prior art, and enables implementation of active foveation within a display apparatus used in devices for implementing simulated environments, to mimic the human visual system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
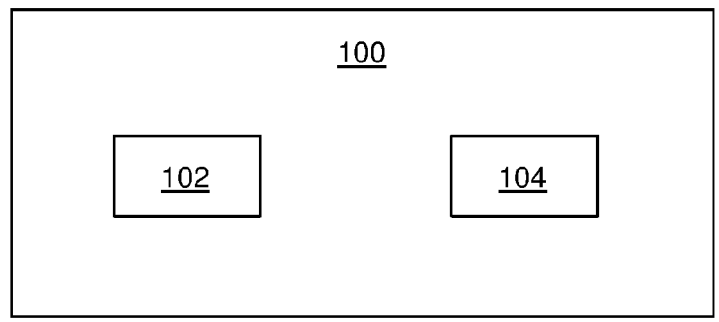
FIGS. 1-2 are block diagrams of exemplary architectures of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
  at least one context image projector or at least one context display for rendering a context image, wherein an angular width of a projection of the rendered context image ranges from 40 degrees to 220 degrees; and
  at least one focus image projector for rendering a focus image, wherein an angular width of a projection of the rendered focus image ranges from 5 degrees to 60 degrees,
wherein an arrangement is made to combine the projection of the rendered focus image with the projection of the rendered context image to create a visual scene.

In another aspect, an embodiment of the present disclosure provides a method of displaying, via a display apparatus comprising at least one context image projector or at least one context display, and at least one focus image projector, the method comprising:
(i) rendering a context image via the at least one context image projector or the at least one context display, wherein an angular width of a projection of the rendered context image ranges from 40 degrees to 220 degrees;
(ii) rendering a focus image via the at least one focus image projector, wherein an angular width of a projection of the rendered focus image ranges from 5 degrees to 60 degrees; and
(iii) arranging for the projection of the rendered focus image to be combined with the projection of the rendered context image to create a visual scene.

The present disclosure provides a display apparatus and a method of displaying via the display apparatus using projectors. The display apparatus described herein is not limited in operation by size of displays (or screens) adapted to facilitate rendering of the context image and/or the focus image thereon. Therefore, the display apparatus may be easily implemented in small-sized devices such as virtual reality devices. Further, the display apparatus simulates active foveation of the human visual system by detecting gaze direction of the eyes of the user of the device. Furthermore, the displayed images using the described display apparatus are continuous due to proper optimisation of optical paths of projections of focus and context images. Specifically, optical paths of the projections of focus and context images may be optimised separately using two or more projectors. Therefore, the described display apparatus is operable to closely imitate gaze contingency similar to the human visual system. The method of displaying using the described display apparatus is easy to implement, and possesses robust active foveation capability. Further, the display apparatus is inexpensive, and easy to manufacture.

The display apparatus comprises at least one context image projector or at least one context display for rendering a context image, and at least one focus image projector for rendering a focus image. Further, an angular width of a projection of the rendered context image ranges from 40 degrees to 220 degrees and an angular width of a projection of the rendered focus image ranges from 5 degrees to 60 degrees. An arrangement is made to combine the projection of the rendered focus image with the projection of the rendered context image to create a visual scene. Specifically, the visual scene may correspond to a scene within a simulated environment to be presented to a user of a device, such as a head-mounted virtual reality device, virtual reality glasses, augmented reality headset, and so forth. More specifically, the visual scene may be projected onto eyes of the user. In such instance, the device may comprise the display apparatus.

Optionally, the angular width of a projection of the rendered context image may be greater than 220 degrees. In such instance, angular dimensions of the context display for rendering the context image may be larger than 220 degrees. According to an embodiment, the angular width of a projection of the rendered context image may be for example from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees. According to another embodiment the angular width of a projection of the rendered focus image may be for example from 5, 10, 15, 20, 25, 30, 35, 40, 45 or 50 degrees up to 15, 20, 25, 30, 35, 40, 45, 50, 55 or 60 degrees.

The arrangement of the at least one context image projector or the at least one context display and the at least one focus image projector facilitates the proper combination of the projection of the rendered focus image with the projection of the rendered context image. If the aforementioned combination is less that optimal, the visual scene created may appear distorted.

In an embodiment, the context image relates to a wide image to be rendered and projected via the display apparatus, within the aforementioned angular width, to cope with saccades associated with movement of the eyes of the user. In another embodiment, the focus image relates to an image, to be rendered and projected via the display apparatus, within the aforementioned angular width to cope with microsaccades associated with movement of the eyes of the user. Specifically, the focus image is dimensionally smaller than the context image. Further, the context and focus images collectively constitute the visual scene upon combination of projections thereof.

In an embodiment, the term 'context display' used herein relates to a display (or screen) adapted to facilitate rendering of the context image thereon. Specifically, the at least one context display may be adapted to receive a projection of the context image thereon. According to an embodiment, the context display may be selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

In another embodiment, the term 'context image projector' used herein relates to an optical device for rendering the context image at a display (or screen) associated therewith. According to an embodiment, the context image projector may be selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

In an embodiment, the at least one context image projector may be used to project separate context images for the left and right eyes of the user. It may be understood that the separate context images collectively constitute the context image. According to an embodiment, the at least one context image projector may comprise at least two context image projectors, at least one of the at least two context image projectors being arranged to be used for a left eye of a user, and at least one of the at least two context image projectors being arranged to be used for a right eye of the user. Specifically, the at least two context image projectors may be used such that at least one context image projector may be dedicatedly (or wholly) used to render the context image for one eye of the user. The at least two context image projectors allow separate optimization of optical paths of the separate context images (for example, a context image for the left eye of the user and a context image for the right eye of the user) constituting the context image.

In another embodiment, the at least one context image projector may be arranged to be used for left and right eyes of the user on a shared-basis. For example, one context image projector may be used to render the context image on the display (or screen) associated therewith, on a shared basis. In such example, the one context image projector may project separate context images (for the left and right eyes of the user) collectively constituting the context image on the display (or screen) associated therewith.

It is to be understood that at a given time, only one of the at least one context display and the at least one context image projector are used for rendering the context image. Specifically, at a given time, the context image may be rendered either on the context display or at the display (or screen) associated with the at least one context image projector.

According to an embodiment, the term 'focus image projector' used herein relates to an optical device for projecting the focus image at a display (or screen) associated therewith. According to an embodiment, the focus image projector may be selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

In an embodiment, the display (or screen) associated with the at least one context image projector and the display (or screen) associated with the at least one focus image projector may be same (or shared therebetween). Specifically, in such embodiment, both the at least one context image projector and the at least one focus image projector may render the context image and the focus image respectively, at a common/shared display (or screen).

In an embodiment of the present disclosure, the at least one focus image projector may comprise at least two focus image projectors, at least one of the at least two focus image projectors being arranged to be used for a left eye of a user, and at least one of the at least two focus image projectors being arranged to be used for a right eye of the user. Specifically, the at least two focus image projectors may be used such that at least one focus image projector may be dedicatedly (or wholly) used to render the focus image for one eye of the user. The at least two focus image projectors allow separate optimization of optical paths of the separate focus images (for example, a focus image for the left eye of the user and a focus image for the right eye of the user) constituting the focus image.

Optionally, if the at least one focus image projector is a laser projector, the at least one focus image projector may be arranged to be used for both eyes of the user. Specifically, the laser projector may be operated such that the separate focus images for the both eyes of the user may be projected substantially simultaneously. For example, one laser projector may be used as the at least one focus image projector to project separate focus images (for each of the left eye of the user and the right eye of the user) substantially simultaneously.

According to an embodiment, the display apparatus may further comprise at least one projection surface, an image steering unit, means for detecting a gaze direction, and a processor coupled in communication with the image steering unit and the means for detecting the gaze direction.

In an embodiment, the processor may be hardware, software, firmware or a combination of these, configured to controlling operation of the display apparatus. Specifically, the processor may control operation of the display apparatus to process and display (or project) the visual scene onto the eyes of the user. In an instance wherein the display apparatus is used within the device associated with the user, the processor may or may not be external to the device.

Optionally, the processor may also be coupled in communication with a memory unit. In an embodiment, the memory unit may be hardware, software, firmware or a combination of these, suitable for storing an image of the visual scene and/or the context and focus images to be processed and displayed by the processor. In such embodiment, the memory unit may be used within the device or may be remotely located.

In an embodiment, the means for detecting a gaze direction may relate to specialized equipment for measuring a direction of gaze of the eyes of the user and movement of the eyes, such as eye trackers. Specifically, an accurate detection of the gaze direction may allow the display apparatus to closely implement gaze contingency thereon. Further, the means for detecting the gaze direction, may or may not be placed in contact with the eyes. Examples of the means for detecting a gaze direction include contact lenses with motion sensors, cameras monitoring position of pupil of the eye, and so forth.

In an embodiment, the processor may be configured to receive an input image, and use the detected gaze direction to determine a region of visual accuracy of the input image. In an embodiment, the term 'input image' used herein relates to the image of the visual scene to be displayed via the display apparatus. For example, the input image may be displayed to the eyes of the user. In an embodiment, the input image may be received from an image sensor coupled to the device associated with the user. Specifically, the image sensor (such as image sensor of a pass-through digital camera) may capture an image of a real-world environment as the input image to be projected onto the eyes. In another embodiment, the input image may be received from the memory unit coupled in communication with the processor. Specifically, the memory unit may be configured to store the input image in a suitable format including, but not limited to, Moving Picture Experts Group (MPEG), Joint Photographic Experts Group (JPEG), Tagged Image File Format (TIFF), Portable Network Graphics (PNG), Graphics Interchange Format (GIF), and Bitmap file format (BMP). In such embodiment, the input image may optionally be a computer generated image.

In the aforementioned embodiment, after receiving the input image, the processor may use the detected gaze direction to determine a region of visual accuracy of the input image. In an embodiment, the region of visual accuracy relates to a region of the input image whereat the detected gaze direction of the eye may be focused. Specifically, the region of visual accuracy may be a region of interest (or a fixation point) within the input image, and may be projected onto fovea of the eye. Further, the region of visual accuracy may be the region of focus within the input image. Therefore, it may be evident that the region of visual accuracy relates to a region resolved to a much greater detail as compared to other regions of the input image, when the input image is viewed by a human visual system.

Further, in the aforementioned embodiment, after determining the region of visual accuracy of the input image, the processor may be configured to process the input image to generate the context image and the focus image, the context image having a first resolution and the focus image having a second resolution. The second resolution is higher than the first resolution. The focus image substantially corresponds to the region of visual accuracy of the input image. Further, the context image corresponds to a low-resolution representation of the input image. Therefore, the context image includes the region of visual accuracy of the input image along with remaining region of the input image. Specifically, size of the context image is larger than size of the focus image since the focus image corresponds to only a portion of the context image whereat the detected gaze direction of the eye may be focused.

In an embodiment, the first and second resolutions may be understood in terms of angular resolution. Specifically, pixels per degree indicative of the second resolution is higher than pixels per degree indicative of the first resolution. In an example, fovea of the eye of the user corresponds to 2 degrees of visual field and receives the projection of the focus image of angular cross section width equal to 114 pixels indicative of 57 pixels per degree. Therefore, an angular pixel size corresponding to the focus image would equal 2/114 or 0.017. Further in such example, the retina of the eye corresponds to 180 degrees of visual field and receives projection of the context image of angular cross section width equal to 2700 pixels indicative of 15 pixels per degree. Therefore, an angular pixel size corresponding to the context image would equal 180/2700 or 0.067. As calculated, the angular pixel size corresponding to the context image is clearly much larger than the angular pixel size corresponding to the focus image. However, a perceived angular resolution indicated by a total number of pixels may be greater for the context image as compared to the focus image since the focus image corresponds to only a part of the context image, wherein the part corresponds to the region of visual accuracy of the input image.

In the aforementioned embodiment, along with the generation of the context image and the focus image, a region of the context image that substantially corresponds to the region of visual accuracy of the input image is masked. Specifically, the masking may be performed by the processor to hide (or obscure) the region of the context image corresponding to the region of visual accuracy of the input image. For example, pixels of the context image corresponding to the region of visual accuracy of the input image may be dimmed (or blackened) for masking.

In the aforementioned embodiment, after processing the input image, the processor may be configured to render the context image at the at least one context display or at the at least one projection surface via the at least one context image projector. Further, the processor may be configured to render the focus image at the at least one projection surface via the at least one focus image projector. It is to be understood that either the at least one context display, or the at least one projection surface and the at least one context image projector, may be used to render the context image, at a given time.

According to an embodiment, the term 'projection surface' used herein relates to a display (or screen) adapted to facilitate rendering of the context image and the focus image thereon. Specifically, the at least one projection surface may have transmittance and reflectance specifications suitable for optically rendering the context and focus images thereon. In an example, the at least one projection surface may be a non-transparent (or opaque) surface. In another example, the at least one projection surface may be a semi-transparent surface. Optionally, the at least one projection surface may be implemented by way of at least one of: a polarizer, a retarder, an optical film.

In an embodiment, the at least one projection surface may be arranged to allow the projection of the rendered context image to pass through substantially and to reflect the projection of the rendered focus image substantially. In such embodiment, the context image may be projected onto the at least one projection surface from a back side thereof and the focus image may be projected onto the at least one projection surface from a front side thereof. In an alternate embodiment, the at least one projection surface may be arranged to allow the projection of the rendered focus image to pass through substantially and to reflect the projection of the rendered context image substantially. In such embodiment, the focus image may be projected onto the at least one projection surface from the back side thereof and the context image may be projected onto the at least one projection surface from the front side thereof.

According to an embodiment, the at least one projection surface may be arranged to allow the projections of both the rendered context and focus images to pass through substantially. In such embodiment, both the context image and focus images may be projected onto the at least one projection surface from the back side thereof. According to another embodiment, the at least one projection surface may be arranged to reflect the projections of both the rendered context and focus images substantially. In such embodiment, both the context image and focus images may be projected onto the at least one projection surface from the front side thereof.

According to an embodiment of the present disclosure, the at least one projection surface may comprise at least two projection surfaces, at least one of the at least two projection surfaces being arranged to be used for a left eye of the user, and at least one of the at least two projection surfaces being arranged to be used for a right eye of the user. Specifically, at least one of the at least two projection surfaces may be used for rendering the context and focus images for a left eye of the user. Similarly, at least one of the at least two projection surfaces may be used for rendering the context and focus images for a right eye of the user. Optionally, at least one of the at least two projection surfaces may be semi-transparent to transmit projections of the context image and/or the focus image therethrough.

In an embodiment, the at least one projection surface is implemented as a part of the at least one context display. In such embodiment, the context image may be rendered by the processor at the at least one context display without use of the at least one context image projector. Further, in such embodiment, the at least one context display may also be adapted to facilitate rendering of the focus image thereon.

In an embodiment, after rendering the context and focus images, the processor may be configured to control the image steering unit to adjust a location of a projection of the rendered focus image on the at least one projection surface, such that the projection of the rendered focus image substantially overlaps the projection of the masked region of the rendered context image on the at least one projection surface. Furthermore, the processor may be configured to perform rendering the context image, rendering the focus image, and controlling the image steering unit, substantially simultaneously. Specifically, the combined projections of the rendered context and focus images may constitute a projection of the input image. The context and focus images are rendered substantially simultaneously in order to avoid time lag during combination of projections thereof.

The angular width of the projection of the rendered context image is larger than the angular width of the projection of the rendered focus image. This may be attributed to the fact that the rendered focus image is typically projected on and around the fovea of the eye, whereas the rendered context image is projected on a retina of the eye, of which the fovea is just a small part. Specifically, a combination of the rendered context and focus images constitute the input image and may be projected onto the eye to project the input image thereon.

In an embodiment, the term 'image steering unit' used herein relates to equipment (such as optical elements, electromechanical components, and so forth) for controlling the projection of the rendered focus image on the at least one projection surface. Specifically, the image steering unit may include at least one element/component. Optionally, the image steering unit may also be operable to control the projection of the rendered context image on the at least one projection surface.

In the aforementioned embodiment, the image steering unit substantially overlaps the projection of the rendered focus image with the projection of the masked region of the rendered context image to avoid distortion of the region of visual accuracy of the input image. Specifically, the region of visual accuracy of the input image is represented within both, the rendered context image of low resolution and the rendered focus image of high resolution. The overlap (or superimposition) of projections of low and high-resolution images of a same region results in distortion of appearance of the same region. Further, the rendered focus image of high resolution may contain more information pertaining to the region of visual accuracy of the input image, as compared to the rendered context image of low resolution. Therefore, the region of the context image that substantially corresponds to the region of visual accuracy of the input image is masked, in order to project the rendered high-resolution focus image without distortion.

As described in an embodiment previously, the processor may be configured to mask the region of the context image corresponding to the region of visual accuracy of the input image such that transitional area seams (or edges) between the region of visual accuracy of the displayed input image and remaining region of the displayed input image are minimum. It is to be understood that the region of visual accuracy of the displayed input image corresponds to the projection of the focus image (and the masked region of the context image) whereas the remaining region of the displayed input image corresponds to the projection of the context image. Specifically, the masking should be performed as a gradual gradation in order to minimize the transitional area seams upon superimposition of the context and focus images so that the displayed input image appears continuous. For example, the processor may significantly dim pixels of the context image corresponding to the region of visual accuracy of the input image, and gradually reduce the amount of dimming of the pixels with increase in distance thereof from the region of visual accuracy of the input image. If alignment and appearance of the superimposed (or overlaid) projections of the rendered context and focus images are improper and/or have discontinuities, then the displayed input image would also be improper.

Optionally, masking the region of the context image that substantially corresponds to the region of visual accuracy of the input image may be performed using linear transparency mask blend of inverse values between the context image and the focus image at the transition area, stealth (or camouflage) patterns containing shapes naturally difficult for detection by the eyes of the user, and so forth.

In an embodiment, the image steering unit may comprise at least one first actuator for moving the focus image projector with respect to the at least one projection surface, wherein the processor is configured to control the at least one first actuator to adjust the location of the projection of the rendered focus image on the at least one projection surface. Specifically, the at least one first actuator may move the focus image projector when the gaze direction of the eye shifts from one direction to another. In such instance, the arrangement of the focus image projector and the at least one projection surface may not project the rendered focus image on and around the fovea of the eye. Therefore, the processor may control the at least one first actuator to move the focus image projector with respect to the at least one projection surface, to adjust the location of the projection of the rendered focus image on the at least one projection surface such that the rendered focus image may be projected on and around the fovea of the eye even on occurrence of shift in the gaze direction. More specifically, the processor may control the at least one first actuator by generating an actuation signal (such as an electric current, hydraulic pressure, and so forth).

In an example, the at least one first actuator may move the focus image projector closer or away from the at least one projection surface. In another example, the at least one first actuator may move the focus image projector laterally with respect to the at least one projection surface. In yet another example, the at least one first actuator may tilt and/or rotate the focus image projector with respect to the at least one projection surface.

According to an embodiment, the image steering unit may comprise at least one optical element that is positioned on an optical path between the at least one projection surface and the at least one focus image projector and at least one second actuator for moving the at least one optical element with respect to the at least one focus image projector. The at least one optical element is selected from the group consisting of a lens, a prism, a mirror, a beam splitter, and an optical waveguide. In such embodiment, the processor is configured to control the at least one second actuator to adjust the location of the projection of the rendered focus image on the at least one projection surface. Specifically, the at least one optical element may change the optical path of the projection of the rendered focus image on the at least one projection surface in order to facilitate projection of the rendered focus image on and around the fovea of the eye even on occurrence of shift in the gaze direction. More specifically, the processor may control the at least one second actuator by generating an actuation signal (such as an electric current, hydraulic pressure, and so forth).

For example, a prism may be positioned on an optical path between a projection surface and a focus image projector. Specifically, the optical path of the projection of the rendered focus image may change on passing through the prism to adjust the location of the projection of the rendered focus image on the projection surface. Further, the prism may be moved transversally and/or laterally, be rotated, be tilted, and so forth, by a second actuator in order to facilitate projection of the rendered focus image on and around the fovea of the eye even on occurrence of shift in the gaze direction.

For example, the at least one optical element that is positioned on an optical path between the at least one projection surface and the at least one focus image projector, may be an optical waveguide. Specifically, the optical waveguide may be arranged to allow the projection of the focus image to pass therethrough, and to adjust the location of the projection of the rendered focus image on the at least one projection surface. Therefore, the optical waveguide may be semi-transparent. In an embodiment, the optical waveguide may further comprise optical elements therein such as microprisms, mirrors, diffractive optics, and so forth.

In an embodiment, the image steering unit comprises at least one third actuator for moving the at least one projection surface, wherein the processor is configured to control the at least one third actuator to adjust the location of the projection of the rendered focus image on the at least one projection surface. Specifically, the at least one third actuator may move the at least one projection surface in order to facilitate projection of the rendered focus image on and around the fovea of the eye even on occurrence of shift in the gaze direction. More specifically, the processor may control the at least one third actuator by generating an actuation signal (such as an electric current, hydraulic pressure, and so forth).

In an example, the at least one third actuator may move the at least one projection surface closer or away from the at least one focus image projector. In another example, the at least one third actuator may move the at least one projection surface laterally with respect to the at least one focus image projector. In yet another example, the at least one third actuator may tilt and/or rotate the at least one projection surface.

According to an embodiment, the display element may comprise at least one focusing lens that is positioned on an optical path between the at least one projection surface and the at least one focus image projector, and at least one fourth actuator for moving the at least one focusing lens with respect to the at least one focus image projector. Further, in such embodiment, the processor is configured to control the at least one fourth actuator to adjust a focus of the projection of the rendered focus image. Specifically, the at least one focusing lens may utilize specialized properties thereof to adjust the focus of the projection of the rendered focus image by changing the optical path thereof. More specifically, the focus of the projection of the rendered focus image may be adjusted to accommodate for diopter tuning, astigmatism correction, and so forth. Further, the processor may control the at least one fourth actuator by generating an actuation signal (such as an electric current, hydraulic pressure, and so forth).

According to another embodiment, the display apparatus may comprise the at least one focusing lens that is positioned on an optical path between the at least one first optical element and the at least one focus display, wherein the processor is configured to control at least one active optical characteristic of the at least one focusing lens by applying a control signal to the at least one focusing lens. Specifically, the active optical characteristics of the at least one focusing lens may include, but are not limited to, focal length, and optical power. Further, in such embodiment, the control signal may be electrical signal, hydraulic pressure, and so forth.

In an embodiment, the at least one focusing lens may be a Liquid Crystal lens (LC lens), and so forth. Optionally, the at least one focusing lens may be positioned on an optical path between the at least one first optical element and the at least one context display.

In an embodiment, the processor may implement image processing functions for the at least one projection surface. Specifically, the image processing functions may be implemented prior to rendering the context image and the focus image at the at least one projection surface. More specifically, implementation of such image processing functions may optimize quality of the rendered context and focus images. Therefore, the image processing function may be selected by taking into account properties of the at least one projection surface and the properties of the input image.

According to an embodiment, image processing functions for the at least one projection surface may comprise at least one function for optimizing perceived context image and/or the focus image quality, the at least one function selected from the group comprising low pass filtering, colour processing, and gamma correction. In an embodiment, the image processing functions for the at least one projection surface may further comprise edge processing to minimize perceived distortion on a boundary of combined projections of the rendered context and focus images.

The present description also relates to the method as described above. The various embodiments and variants disclosed above apply mutatis mutandis to the method.

DETAILED DESCRIPTION OF THE DRAWINGS

Referring to FIG. 1, illustrated is a block diagram of an exemplary architecture of a display apparatus 100, in accordance with an embodiment of the present disclosure. The display apparatus 100 includes at least one context image projector or at least one context display 102 for rendering a context image, and at least one focus image projector 104 for rendering a focus image. An arrangement is made to combine the projection of the rendered focus image with the projection of the rendered context image to create a visual scene.

Figure 2:
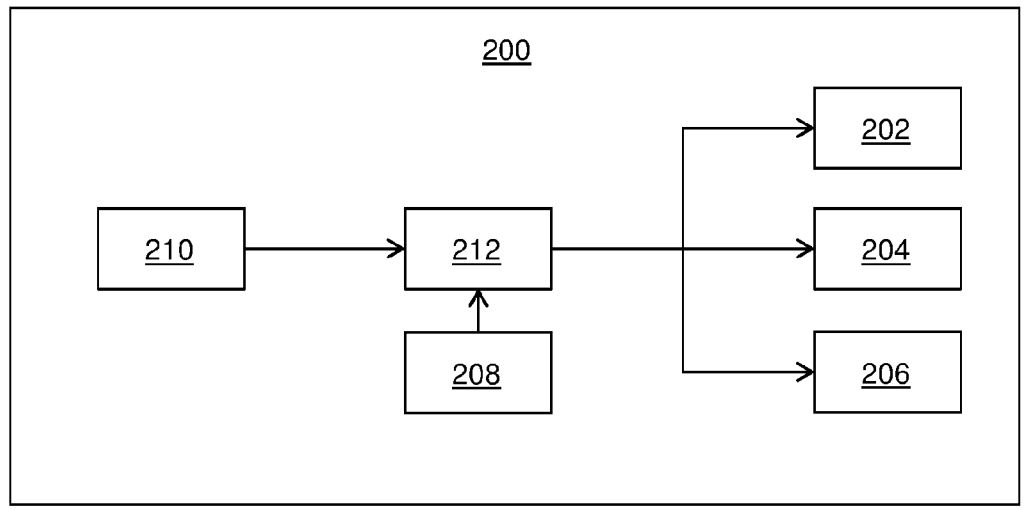

Referring to FIG. 2, illustrated is a block diagram of an exemplary architecture of a display apparatus 200, in accordance with another embodiment of the present disclosure. The display apparatus 200 includes at least one projection surface 202, at least one context image projector or at least one context display 204, at least one focus image projector 206, an image steering unit 208, means for detecting a gaze direction 210, and a processor 212. The processor 212 is coupled in communication with the image steering unit 208 and the means for detecting the gaze direction 210. Further, the processor 212 is also coupled to the at least one projection surface 202, the at least one context image projector or at least one context display 204, and the at least one focus image projector 206.

Figure 3:
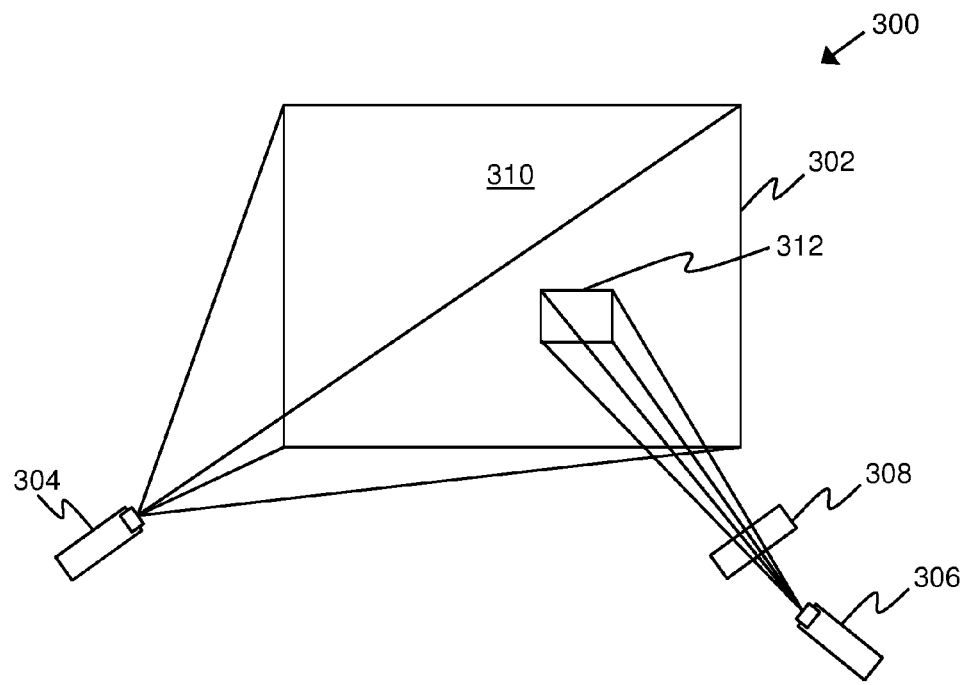
FIGS. 3-7 are exemplary implementations of the display apparatus, in accordance with various embodiments of the present disclosure.

Referring to FIG. 3, illustrated is an exemplary implementation of a display apparatus 300, in accordance with an embodiment of the present disclosure. As shown, the display apparatus 300 comprises at least one projection surface (depicted as a projection surface 302), at least one context image projector (depicted as a context image projector 304), at least one focus image projector (depicted as a focus image projector 306), means for detecting a gaze direction (not shown), a processor (not shown), and an image steering unit comprising at least one first actuator (not shown), at least one optical element (depicted as an optical element 308) and at least one second actuator (not shown). For example, the optical element 308 is selected from a group consisting of a lens, a prism, a mirror, a beam splitter, and an optical waveguide. The processor of the display apparatus 300 is configured to render a context image 310 at the projection surface 302 via the context image projector 304, and to render a focus image 312 at the projection surface 302 via the focus image projector 306. Further, the processor of the display apparatus 300 is configured to control the second actuator (not shown) to adjust a location of a projection of the rendered focus image 312 on the projection surface 302. As shown, both the context image 310 and the focus image 312 are projected from a same side of the projection surface 302.

Figure 4:
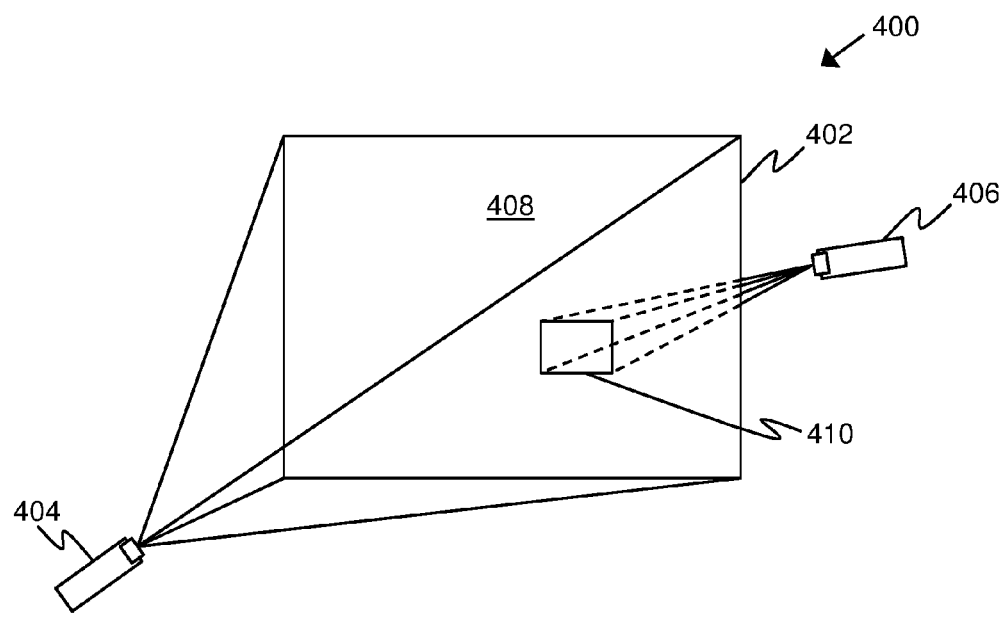

Referring to FIG. 4, illustrated is an exemplary implementation of a display apparatus 400, in accordance with another embodiment of the present disclosure. As shown, the display apparatus 400 comprises at least one projection surface (depicted as a projection surface 402), at least one context image projector (depicted as a context image projector 404), at least one focus image projector (depicted as a focus image projector 406), means for detecting a gaze direction (not shown), a processor (not shown), and an image steering unit (not shown). The processor of the display apparatus 400 is configured to render a context image 408 at the projection surface 402 via the context image projector 404, and to render a focus image 410 at the projection surface 402 via the focus image projector 406. As shown, the context image 408 is projected from a front side of the projection surface 420 and the focus image 410 is projected from a back side of the projection surface 402.

Figure 5:
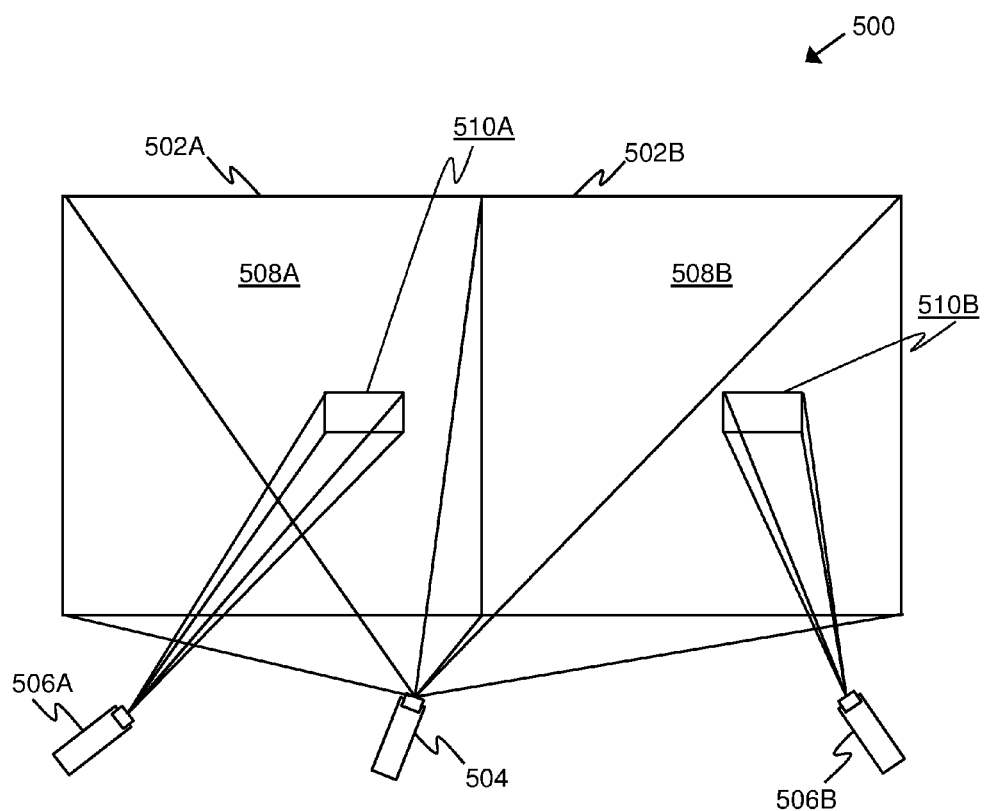

Referring to FIG. 5, illustrated is an exemplary implementation of a display apparatus 500, in accordance with another embodiment of the present disclosure. As shown, the display apparatus 500 comprises at least one projection surface comprising at least two projection surfaces (depicted as projection surfaces 502A and 502B), at least one context image projector (depicted as a context image projector 504), at least one focus image projector comprising at least two focus image projectors (depicted as two focus image projectors 506A and 506B), means for detecting a gaze direction (not shown), a processor (not shown), and an image steering unit (not shown). Further, the projection surface 502A of the at least two projection surfaces is arranged to be used for a left eye of a user, and the projection surface 502B of the at least two projection surfaces is arranged to be used for a right eye of the user. Furthermore, the focus image projector 506A of the at least two focus image projectors is arranged to be used for the left eye of a user, and the focus image projector 506B of the at least two focus image projectors is arranged to be used for the right eye of the user. The processor of the display apparatus 500 is configured to render a context image (depicted as two context images 508A and 508B) at the two projection surfaces 502A and 502B respectively, via the context image projector 504. In such instance, the context image 508A is used for the left eye of the user, and the context image 508B is used for the right eye of the user. Further, the processor of the display apparatus 500 is configured to render a focus image (depicted as two focus images 510A and 510B) at the two projection surfaces 502A and 502B via the two focus image projectors 506A and 506B respectively. In such instance, the focus image 510A is used for the left eye of the user, and the focus image 510B is used for the right eye of the user. As shown, both the context images 508A and 508B and the focus images 510A and 510B are projected from a same side of the at least one projection surface.

Figure 6:
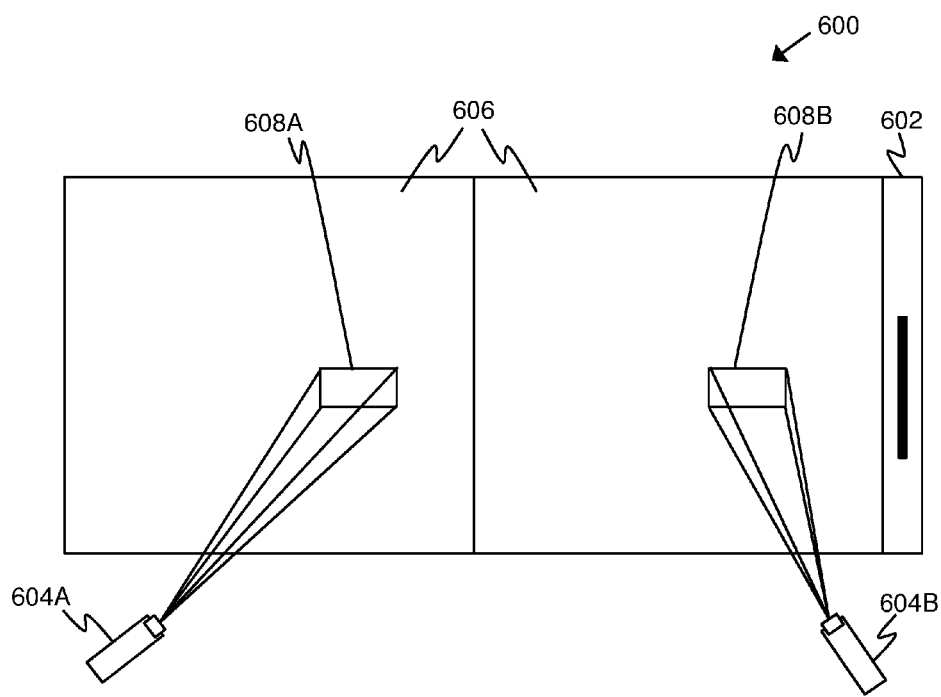

Referring to FIG. 6, illustrated is an exemplary implementation of a display apparatus 600, in accordance with another embodiment of the present disclosure. As shown, the display apparatus 600 comprises at least one projection surface implemented as a part of at least one context display (depicted as a context display 602), at least one focus image projector comprising at least two focus image projectors (depicted as two focus image projectors 604A and 604B), means for detecting a gaze direction (not shown), a processor (not shown), and an image steering unit (not shown). The processor of the display apparatus 600 is configured to render a context image 606 at the context display 602. Further, the processor of the display apparatus 600 is configured to render a focus image (depicted as two focus images 608A and 608B) at the at least one projection surface implemented as a part of the context display 602 via the two focus image projectors 604A and 604B respectively. In such instance, the focus image 608A is used for the left eye of the user, and the focus image 608B is used for the right eye of the user. As shown, both the focus images 608A and 608B and are projected from a same side of the at least one projection surface implemented as a part of the context display 602.

Figure 7:
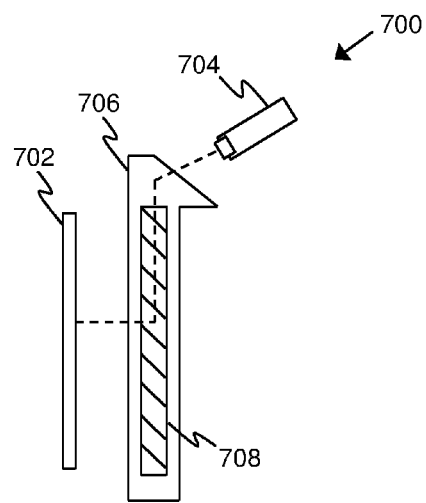

Referring to FIG. 7, illustrated is an exemplary implementation of a display apparatus 700, in accordance with another embodiment of the present disclosure. As shown, the display apparatus 700 comprises at least one projection surface 702 implemented as a part of at least one context display, and at least one focus image projector 704. Further, the display apparatus 700 comprises an image steering unit comprising at least one optical element 706 that is positioned on an optical path between the at least one projection surface 702 and the at least one focus image projector 704. As shown, the at least one optical element 706 is an optical waveguide. Further, a processor of the display apparatus 700 is configured to control at least one second actuator (not shown) to adjust a location of the projection of the rendered focus image on the at least one projection surface 702. The at least one optical element 706 (or the depicted optical waveguide) further comprises optical elements 708 therein such as microprisms, mirrors, diffractive optics, and so forth.

Figure 8:
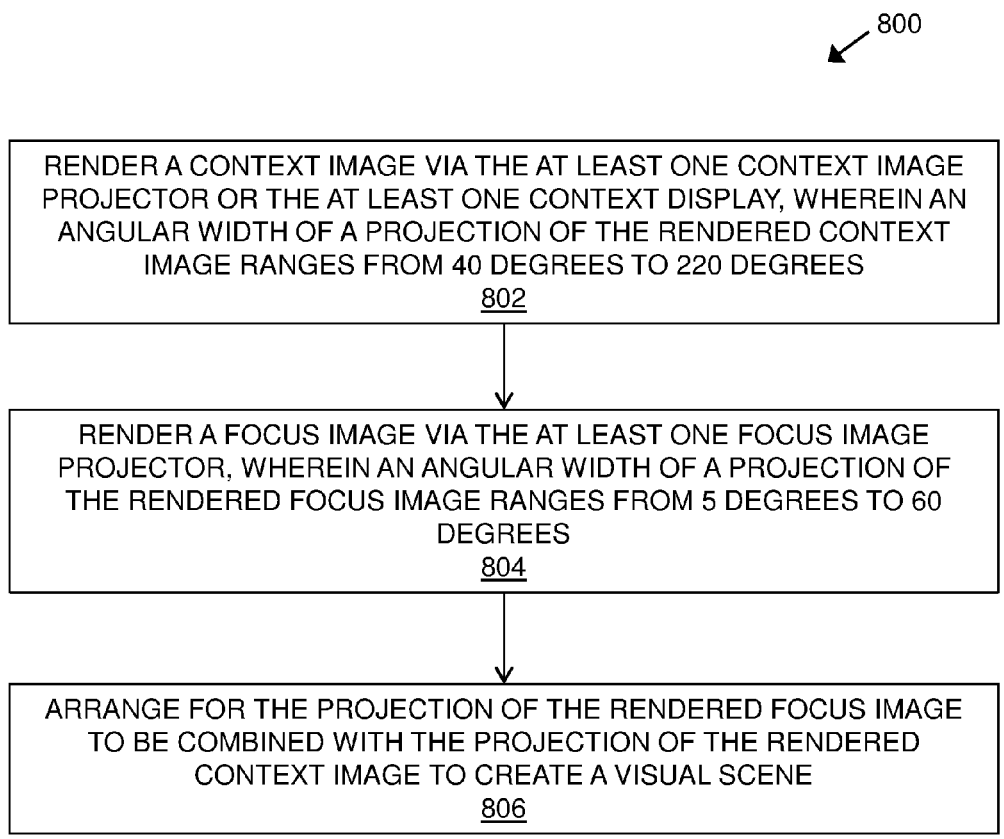
FIG. 8 illustrates steps of a method of displaying via a display apparatus, in accordance with an embodiment of the present disclosure.

Referring to FIG. 8, illustrated are steps of a method 800 of displaying via a display apparatus (such as the display apparatus 100 of FIG. 1), in accordance with an embodiment of the present disclosure. At step 802, a context image is rendered via the at least one context image projector or the at least one context display, wherein an angular width of a projection of the rendered context image ranges from 40 degrees to 220 degrees. At step 804, a focus image is rendered via the at least one focus image projector, wherein an angular width of a projection of the rendered focus image ranges from 5 degrees to 60 degrees. At step 806, an arrangement is made for the projection of the rendered focus image to be combined with the projection of the rendered context image to create a visual scene.

The steps 802 to 806 are only illustrative and other alternatives can also be provided where one or more steps are added, one or more steps are removed, or one or more steps are provided in a different sequence without departing from the scope of the claims herein. In an example, in the method 800, the location of the projection of the rendered focus image may be adjusted by controlling at least one first actuator of the image steering unit to move the focus image projector with respect to the at least one projection surface. In another example, in the method 800, the location of the projection of the rendered focus image may be adjusted by controlling at least one second actuator of the image steering unit to move at least one optical element of the image steering unit with respect to the at least one focus image projector, wherein the at least one optical element is positioned on an optical path between the at least one projection surface and the at least one focus image projector. In yet another example, in the method 800, the location of the projection of the rendered focus image may be adjusted by controlling at least one third actuator of the image steering unit to move the at least one projection surface. Optionally, the method 800 may comprise adjusting a focus of the projection of the rendered focus image by controlling at least one fourth actuator of the display apparatus to move at least one focusing lens of the display apparatus with respect to the at least one focus image projector, wherein the at least one focusing lens is positioned on an optical path between the at least one projection surface and the at least one focus image projector.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
   at least one context image projector or at least one context display for rendering a context image, wherein an angular width of a projection of the rendered context image ranges from 40 degrees to 220 degrees; and
   at least one focus image projector for rendering a focus image, wherein an angular width of a projection of the rendered focus image ranges from 5 degrees to 60 degrees,
   at least one projection surface;
   an image steering unit;
   means for detecting a gaze direction; and
   a processor coupled in communication with the image steering unit and the means for detecting the gaze direction, wherein the processor is configured to:
   (a) receive an input image, and use the detected gaze direction to determine a region of visual accuracy of the input image;
   (b) process the input image to generate the context image and the focus image, the context image having a first resolution and the focus image having a second resolution, wherein:
      a region of the context image that substantially corresponds to the region of visual accuracy of the input image is masked,
      the focus image substantially corresponds to the region of visual accuracy of the input image, and the second resolution is higher than the first resolution;
   (c) render the context image at the at least one context display or at the at least one projection surface via the at least one context image projector;
   (d) render the focus image at the at least one projection surface via the at least one focus image projector; and
   (e) control the image steering unit to adjust a location of the projection of the rendered focus image on the at least one projection surface, such that the projection of the rendered focus image substantially overlaps the projection of the masked region of the rendered context image on the at least one projection surface,
   wherein the processor is configured to perform (c), (d) and (e) substantially simultaneously, and
   an arrangement is made to combine the projection of the rendered focus image with the projection of the rendered context image to create a visual scene.

2. The display apparatus of claim 1, wherein the at least one focus image projector comprises at least two focus image projectors, at least one of the at least two focus image projectors being arranged to be used for a left eye of a user, and at least one of the at least two focus image projectors being arranged to be used for a right eye of the user.

3. The display apparatus of claim 1, wherein the at least one context image projector comprises at least two context image projectors, at least one of the at least two context image projectors being arranged to be used for a left eye of a user, and at least one of the at least two context image projectors being arranged to be used for a right eye of the user.

4. The display apparatus of claim 1, wherein the at least one context image projector is arranged to be used for left and right eyes of a user on a shared-basis.

5. The display apparatus of claim 1, wherein the at least one projection surface comprises at least two projection surfaces, at least one of the at least two projection surfaces being arranged to be used for a left eye of a user, and at least one of the at least two projection surfaces being arranged to be used for a right eye of the user.

6. The display apparatus of claim 1, wherein the at least one projection surface is implemented as a part of the at least one context display.

7. The display apparatus of claim 1, wherein the at least one projection surface is implemented by way of at least one of: a polarizer, a retarder, an optical film.

8. The display apparatus of claim 1, wherein the image steering unit comprises at least one first actuator for moving the focus image projector with respect to the at least one projection surface, wherein the processor is configured to control the at least one first actuator to adjust the location of the projection of the rendered focus image on the at least one projection surface.

9. The display apparatus of claim 1, wherein the image steering unit comprises:
   at least one optical element that is positioned on an optical path between the at least one projection surface and the at least one focus image projector, the at least one optical element being selected from the group consisting of a lens, a prism, a mirror, a beam splitter, and an optical waveguide; and
   at least one second actuator for moving the at least one optical element with respect to the at least one focus image projector, wherein the processor is configured to control the at least one second actuator to adjust the location of the projection of the rendered focus image on the at least one projection surface.

10. The display apparatus of claim 1, wherein the image steering unit comprises at least one third actuator for moving the at least one projection surface, wherein the processor is configured to control the at least one third actuator to adjust the location of the projection of the rendered focus image on the at least one projection surface.

11. The display apparatus of claim 1, wherein the display apparatus comprises:
at least one focusing lens that is positioned on an optical path between the at least one projection surface and the at least one focus image projector; and
at least one fourth actuator for moving the at least one focusing lens with respect to the at least one focus image projector,
wherein the processor is configured to control the at least one fourth actuator to adjust a focus of the projection of the rendered focus image.

12. The display apparatus of claim 2, wherein the display apparatus comprises:
at least one focusing lens that is positioned on an optical path between the at least one first optical element and the at least one focus display,
wherein the processor is configured to control at least one active optical characteristic of the at least one focusing lens by applying a control signal to the at least one focusing lens.

13. The display apparatus of claim 1, wherein the context display is selected from the group consisting of: a Liquid Crystal Display, a Light Emitting Diode-based display, an Organic Light Emitting Diode-based display, a micro Organic Light Emitting Diode—based display, and a Liquid Crystal on Silicon-based display.

14. The display apparatus of claim 1, wherein the context image projector and/or the focus image projector are independently selected from the group consisting of: a Liquid Crystal Display-based projector, a Light Emitting Diode-based projector, an Organic Light Emitting Diode-based projector, a Liquid Crystal on Silicon-based projector, a Digital Light Processing-based projector, and a laser projector.

15. A method of displaying, via a display apparatus comprising at least one context image projector or at least one context display, and at least one focus image projector, the method comprising:
(i) rendering a context image via the at least one context image projector or the at least one context display, wherein an angular width of a projection of the rendered context image ranges from 40 degrees to 220 degrees;
(ii) rendering a focus image via the at least one focus image projector, wherein an angular width of a projection of the rendered focus image ranges from 5 degrees to 60 degrees; and
(iii) arranging for the projection of the rendered focus image to be combined with the projection of the rendered context image to create a visual scene; and
wherein the display apparatus further comprises at least one projection surface, an image steering unit and means for detecting a gaze direction, and wherein the method further comprises:
(iv) detecting a gaze direction, and using the detected gaze direction to determine a region of visual accuracy of an input image;
(v) processing the input image to generate the context image and the focus image, the context image having a first resolution and the focus image having a second resolution, the second resolution being higher than the first resolution, wherein the processing comprises:
masking a region of the context image that substantially corresponds to the region of visual accuracy of the input image; and
generating the focus image to substantially correspond to the region of visual accuracy of the input image; and
(vi) controlling the image steering unit to adjust a location of the projection of the rendered focus image on the at least one projection surface, such that the projection of the rendered focus image substantially overlaps the projection of the masked region of the rendered context image on the at least one projection surface,
wherein (i), (ii) and (vi) are performed substantially simultaneously.

16. The method of claim 15, wherein the location of the projection of the rendered focus image is adjusted by controlling at least one first actuator of the image steering unit to move the focus image projector with respect to the at least one projection surface.

17. The method of claim 15, wherein the location of the projection of the rendered focus image is adjusted by controlling at least one second actuator of the image steering unit to move at least one optical element of the image steering unit with respect to the at least one focus image projector, wherein the at least one optical element is positioned on an optical path between the at least one projection surface and the at least one focus image projector, and/or the location of the projection of the rendered focus image is adjusted by controlling at least one third actuator of the image steering unit to move the at least one projection surface.

18. The method of claim 15, further comprising adjusting a focus of the projection of the rendered focus image by controlling at least one fourth actuator of the display apparatus to move at least one focusing lens of the display apparatus with respect to the at least one focus image projector, wherein the at least one focusing lens is positioned on an optical path between the at least one projection surface and the at least one focus image projector.

* * * * *